(12) United States Patent
Adams

(10) Patent No.: US 10,813,344 B2
(45) Date of Patent: Oct. 27, 2020

(54) BOX-LESS BEEHIVE

(71) Applicant: Cody Adams, Mona, UT (US)

(72) Inventor: Cody Adams, Mona, UT (US)

(73) Assignee: BEE SCIENTIFIC, LLC, Mona, UT (US)

( * ) Notice: Subject to any disclaimer, the term of this patent is extended or adjusted under 35 U.S.C. 154(b) by 190 days.

(21) Appl. No.: 15/303,994

(22) PCT Filed: Apr. 21, 2015

(86) PCT No.: PCT/US2015/026793
§ 371 (c)(1),
(2) Date: Oct. 13, 2016

(87) PCT Pub. No.: WO2015/164319
PCT Pub. Date: Oct. 29, 2015

(65) Prior Publication Data
US 2017/0035033 A1    Feb. 9, 2017

Related U.S. Application Data

(60) Provisional application No. 61/982,988, filed on Apr. 23, 2014.

(51) Int. Cl.
*A01K 47/02* (2006.01)
*A01K 47/06* (2006.01)
*A01K 47/00* (2006.01)
*A01K 59/00* (2006.01)

(52) U.S. Cl.
CPC .............. *A01K 47/02* (2013.01); *A01K 47/00* (2013.01); *A01K 47/06* (2013.01); *A01K 59/00* (2013.01)

(58) Field of Classification Search
CPC ........ A01K 47/00; A01K 47/02; A01K 47/04; A01K 47/06; A01K 59/00
See application file for complete search history.

(56) References Cited

U.S. PATENT DOCUMENTS

| | | | |
|---|---|---|---|
| 620,859 A | 3/1899 | Taylor | |
| 2,146,844 A * | 2/1939 | Alejandro | ............. A01K 47/02 449/17 |
| 2,584,305 A | 2/1952 | Taylor | |
| 2,709,820 A | 6/1955 | Wahl | |
| 3,071,784 A | 1/1963 | Kolb et al. | |

(Continued)

FOREIGN PATENT DOCUMENTS

| EP | 82303865.8 | 7/1982 |
|---|---|---|
| EP | 0071409 | 2/1983 |

(Continued)

*Primary Examiner* — Son T Nguyen
(74) *Attorney, Agent, or Firm* — Workman Nydegger

(57) ABSTRACT

A beehive according to this disclosure includes a plurality of modular sections that are configured to be positioned adjacent to one another in a manner that enables simplified, even automated, extraction of honey. Such a beehive may include, or even consist essentially of, a plurality of interchangeable rings, or plates, that are configured to be stacked relative to one another in an assembled relationship, and to be secured together in the assembled relationship. In some embodiments, a beehive may consist of a plurality of rings and a mechanism for securing the rings in an assembled relationship (e.g., tie rods, etc.).

12 Claims, 14 Drawing Sheets

(56) References Cited

U.S. PATENT DOCUMENTS

| | | | |
|---|---|---|---|
| 3,704,471 A | | 12/1972 | Bielby |
| 4,133,065 A | | 1/1979 | Hogg |
| 4,185,343 A | * | 1/1980 | Ross ................. A01K 47/02 449/17 |
| 4,199,832 A | | 4/1980 | Glasscock et al. |
| 5,372,535 A | * | 12/1994 | Mills ................. A01K 47/00 449/36 |
| 7,686,672 B2 | | 3/2010 | Katsampis |
| 8,465,340 B1 | * | 6/2013 | Allan ................. A01K 67/033 449/26 |
| 2003/0027490 A1 | * | 2/2003 | Wilkinson ............ A01K 47/00 449/38 |
| 2011/0312244 A1 | | 12/2011 | Vincent |
| 2015/0320018 A1 | * | 11/2015 | Amundson ............ A01K 47/06 449/6 |
| 2016/0029603 A1 | * | 2/2016 | Heidinger ............ A01K 47/02 449/13 |
| 2017/0000092 A1 | * | 1/2017 | Domocsok ............ A01K 47/00 |

FOREIGN PATENT DOCUMENTS

| | | | | |
|---|---|---|---|---|
| EP | 71409 A1 | * | 2/1983 | |
| EP | 292401 A1 | * | 11/1988 | |
| GB | 586654 A | | 3/1947 | |
| JP | 09224520 A | * | 9/1997 | |
| JP | 2000023586 A | * | 1/2000 | |
| WO | 2008061286 A1 | | 5/2008 | |
| WO | WO-2008061286 A1 | * | 5/2008 | ............ A01K 47/02 |
| WO | WO-2008117952 A1 | * | 10/2008 | ............ A01K 47/02 |
| WO | WO-2010099280 A1 | * | 9/2010 | ............ A01K 47/02 |

* cited by examiner

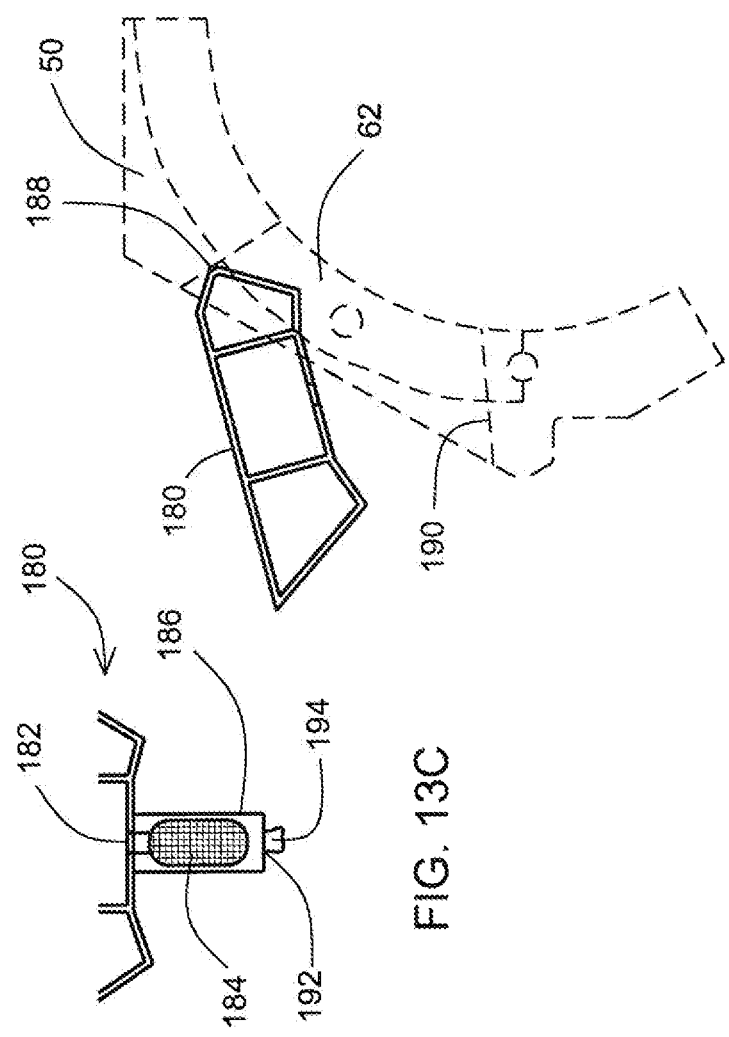
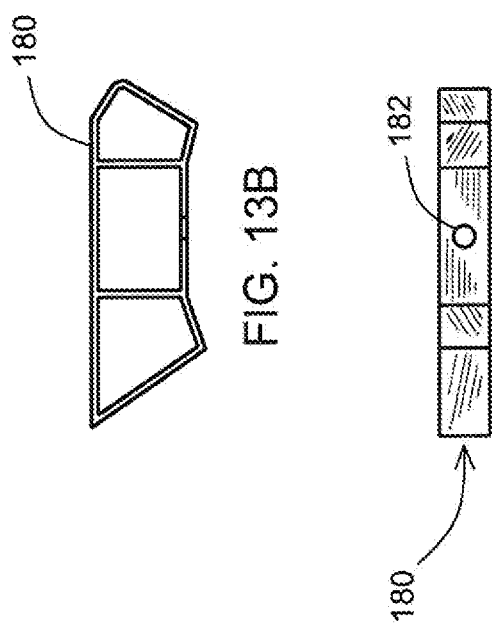

BOX-LESS BEEHIVE

CROSS-REFERENCE TO RELATED APPLICATION

This application claims the benefit of PCT application number PCT/US2015/026793 filed Apr. 21, 2015, which claims priority to U.S. provisional application No. 61/982,988 filed Apr. 23, 2014. Both of which are incorporated herein by reference.

TECHNICAL FIELD

This disclosure relates generally to beehives and, more specifically, to beehives with rings, or frames, that comprise modular structures that may be tailored to perform various functions, including housing the honey comb, the colony and the queen. Even more specifically, the rings of a beehive according to this disclosure may be stacked together to form a complete structure for a beehive. The modular rings may yield a fully functioning beehive without an external casing or box.

BACKGROUND OF RELATED ART

Beekeeping is a well-known and an extremely ancient art. The configurations of beehives have varied widely over time and from one location to another. In ancient times, some beehives were constructed in such a way that beekeepers could only extract honey from them by totally destroying the beehives. In more modern times, beehives have been designed to enable inspection and the removal of honey without significant harm to the beehive or the colony of bees that lives in the beehive. Such a beehive may also provide sufficient space for the colony and its honey to enable the colony to continue to thrive in a healthy manner from year to year.

Although a wide range of specific beehive structures has been proposed and developed over time, current commercial beekeeping operations typically use the Langstroth beehive, which has been in use for many years. The Langstroth beehive itself has been subject to many modifications, such as the Aspinwall anti-swarming hive, but, on the whole, with or without modifications, the Langstroth beehive continues to serve as the standard in the beekeeping industry, for both commercial beekeepers and hobby beekeepers.

Despite its wide acceptance, the Langstroth beehive suffers from a number of disadvantages. Among these is the cumbersome and time-consuming disassembly required for a beekeeper to inspect the interior of the beehive and to extract honey therefrom. In particular, disassembly of the Langstroth beehive is a hands-on process that requires removal of the external cover from the remainder of the beehive, along with removal of the inner cover, if one is used. In addition, supers (which are boxes) are typically removed from the beehive to gain access to the frames therein and to the honeycomb and honey on each frame. If access to a hive body (which is a box) is desired (e.g., for inspection of the brood chamber, or bee space, etc.), further disassembly of the beehive may be required (e.g., the removal of additional supers and/or hive bodies, etc.). Disassembly of a Langstroth beehive may also be hard on the frames, which typically fail about a tenth of the time during typically inspection and honey extraction processes.

A summary of improvements to, variations on and accessories to the Langstroth beehive follows:

U.S. Pat. No. 620,859, titled OUTER CASE FOR BEEHIVES and issued on Mar. 7, 1899 to J. N. Taylor, discloses a chaff-hive, or outer case, for a beehive. The chaff-hive, which is configured to protect the beehive from the elements, includes a set of telescopic sections that are configured to accommodate and encase beehives of various heights, while shielding the entrance to a beehive from drafts of air while providing the beehive with sufficient ventilation.

U.S. Pat. No. 2,584,305, titled TEMPERATURE RESPONSIVE VENTILATOR FOR BEEHIVES and issued on Feb. 5, 1952 to M. I. Taylor, discloses a ventilators for beehives and, more specifically, ventilators that are automatically controlled by the ambient atmospheric temperature. Control of the temperature within a hive is an important consideration with beekeepers. During excessively hot weather, the temperature within a hive may become so excessive as to cause the colony of bees to swarm. The provision of adequate ventilation is not in and of itself a serious problem, but, when such ventilation is aired, the temperature within the beehive may become too cold, particularly at geographic locations and/or during times of the year when temperatures change rapidly (e.g., during cooler seasons, etc.). As a result, the beehive may be overcooled, which may cause the bee cluster within the beehive to contract in size, becoming so dense that many of the bees may be suffocated.

U.S. Pat. No. 2,709,820, titled BEEHIVE COVER and issued on Jun. 7, 1955 to L. F. Wahl, provides:

"There are many problems connected with the keeping of bees for the commercial production of honey. In order to obtain maximum output of honey at the proper season and to insure maximum propagation of the bees, the hive should be insulated against high external temperatures during the day, and to prevent the hive from cooling off too much at night. When the hive is not protected in some way against relatively wide changes of temperature, the bees waste a large amount of their energy in protecting themselves from colder temperatures at night, and they are sluggish by day."

U.S. Pat. No. 4,199,832, titled MOLDED POLYURETHANE BEEHIVES and issued on Apr. 29, 1980 to Glasscock et al., discloses the preparation of beehives from a synthetic resinous material that exhibits the requisite physical properties to provide a desirable beehive, that is safe for and acceptable to bees and that resists attacks by vermin. The synthetic resinous material may include a urethane that is not rejected by the bees, does not make the bees nervous or does not otherwise interfere with the normal habits of the bees (e.g., secreting honey in the beehive, etc.), and may be foamed and molded into panels.

U.S. Pat. No. 3,071,784, titled BEE OBSERVATION DEVICE and issued on Jan. 8, 1963 to Kolb et al., discloses improvements in the art of handling bees, and more particularly, but not by way of limitation, to an improved device for observing the working and living habits of bees.

U.S. Pat. No. 3,704,471, titled BEEHIVES and issued on Dec. 5, 1972 to Bielby, discloses a beehive with a hive body that includes a brood chamber with a catenary contour. A device in the outer wall of the hive body may selectively control the entry of bees (e.g., no bees, bees that are smaller than a certain size, all bees, etc.) into the brood chamber.

U.S. Pat. No. 7,686,672, titled BEEHIVE LID and issued on Mar. 30, 2010 to Katsampis, discloses a beehive with a top that includes a pair of horizontally adjacent sections. One of the sections includes containers, while the other section provides immediate access into the interior of the beehive. A lid covers the two sections. The top of the lid includes shutters that open and close to enable adjustment of the air flow into and out of the beehive. A folding takeoff board on the bottom of the beehive may reduce the space occupied by the hive during transportation.

European Patent Application No. 82303865.8, titled MODULAR BEEHIVES and filed on Jul. 22, 1982 by Z. Shlomo, discloses a modular beehive with horizontally extending framed honeycomb foundation units secured between hive end units by coupling means to form an element-proof beehive.

SUMMARY

Reference throughout this specification to features, characteristics and/or advantages is not intended to imply that all of the features, characteristics and/or advantages of the disclosed subject matter are present in any single embodiment. Rather, reference to any disclosed features, characteristics and/or advantages is intended to indicate that a specific feature, characteristic or advantage may correspond to at least one embodiment of the disclosed subject matter. One of ordinary skill in the art may also recognize additional features, characteristic and/or advantages that are not expressly disclosed by this specification. The features, characteristics and/or advantages of the disclosed subject matter may be combined in any suitable manner.

The disclosed beehive, which is also referred to herein as a "bee barrel," more simply as a "barrel," and as a "modular hive system," has been developed in response to various deficiencies in existing beehives, including, without limitation, problems and needs in the art that have not yet been adequately addressed by currently available beehives.

A beehive according to this disclosure may provide a permanent abode for a bee colony. The beehive may be configured for ready transport (e.g., to and from a bee yard, etc.). A beehive according to this disclosure may also be designed to accommodate inspection (e.g., of the health and welfare of the colony, etc.), even frequent inspection, with minimal disturbance to the bees.

In various embodiments, a beehive according to this disclosure includes a plurality of modular sections that are configured to be positioned adjacent to one another in a manner that enables simplified, even automated, extraction of honey. Such a beehive may include, or even consist essentially of, a plurality of interchangeable rings, or plates, that are configured to be stacked relative to one another in an assembled relationship, and to be secured together in the assembled relationship. In some embodiments, a beehive may consist of a plurality of rings and a mechanism for securing the rings in an assembled relationship (e.g., tie rods, etc.).

Each ring of a beehive according to this disclosure may provide a particular function in the beehive. Without limitation, one ring may comprise an entrance cap (through which bees may enter and exit a beehive), one or more rings may comprise honey rings (each of which may also be referred to as a "super ring" or as a "foundation ring"), one or more rings may comprise brooding rings (each of which may also be referred to as a "super ring" or as a "foundation ring") and another ring may comprise a feeder ring, or end cap. Collectively, when these and, optionally, other types of rings are assembled with each other and secured to one another, they form a barrel.

In some embodiments, a super ring, or foundation ring, may be configured to receive an insert, which may define a function of the super ring. Such a ring is said to be "configurable." As an example, an insert may have features that enable a super ring with which the insert is assembled to function as a honey super. As another example, the features of an insert may be configured to impart a super ring the functionality of a brood super. Other types of inserts may be configured as queen excluders, bee gates, carriers for queen bars, feeders and foundations.

Each ring may have a shape that reduces or eliminates excess or unwanted (by the bees) space within a beehive. For example, the rings of a beehive according to this disclosure may have a shape that eliminates square corners (i.e., corners with 90° angles), providing greater angles or, in some embodiments, no angles. By providing corners with larger angles, the presence and the collection of burr comb, propolis and debris within the beehive may be reduced. The elimination of square corners and/or provision of corners with larger angles may also reduce the space(s) within which invasive insects, such as hive beetles, can hide, live and/or breed.

Each ring and the insert(s) therefor may also have dimensions that eliminate undesirable gaps, or bee space, within the beehive. More specifically, each ring and its insert(s) may be precisely configured with specified dimensions (e.g., to provide bee space of less than 1 cm at locations where comb and propolis are not wanted).

The thickness of each ring, or the distance from an outside surface of a ring to the inside surface of the ring may be twice the thickness of a Langstroth beehive. The thickness of each ring may prevent warpage of the ring and, thus, may enable to spaces within each ring and between adjacent rings (when the rings are assembled into a beehive) to be precisely maintained. Thus, bees may maintain proper cell depth and bee space may be precisely maintained and, as a consequence, occurrences of burr comb and cross-comb within the beehive may be significantly reduced or even eliminated. As a result, the configuration of each ring may reduce or eliminate the "binding" or "gluing" of adjacent rings to one another, as may occur between frames of a conventional beehive when bees create burr comb or cross-comb that bridges adjacent frames. Thus, the elimination of undesirably large gaps between adjacent rings may enable the rings to come apart quite easily during inspection and extraction.

When relatively thick rings are assembled to form a beehive, the thickness of the beehive may impart it with improved strength and rigidity over the strength and rigidity of a conventional beehive, such as a Langstroth beehive. This increased strength and rigidity of a beehive according to this disclosure may reduce or eliminate the likelihood of breakage and/or foundation failure during inspection and/or extraction.

Any of the above-identified features, as well as combinations of the above-identified features, may reduce stress on the beehive during inspection and extraction. In turn, a beehive that includes one or more of these features is less likely to be damaged during inspection and extraction. Additionally, stress on the bees that occupy the beehive may also be reduced, as may the amount of time and effort a beekeeper spends repairing his or her beehive(s).

Embodiments of a beehive that include thick rings and, thus, thick walls may also protect its inhabitants (e.g., a bee colony) with protection from extreme environmental conditions. More specifically, the thickness of each ring of the disclosed beehive may increase an insulation factor of the beehive and enable more controlled regulation of climate conditions (e.g., temperature, humidity, etc.) within the beehive.

A beehive according to this disclosure may be configured to receive one or more sensors or other devices, which may be used for any of a variety of purposes, including monitoring the health and welfare of the colony, monitoring conditions (e.g., climate conditions, etc.) within the beehive or for any other suitable purpose. Sensors could even be used to obtain more information about the behavior of a bee colony within the beehive. Such information could be used to further improve the beehive, or to give provide the scientific community with information that could be used to improve overall conditions of bee colonies.

In another aspect, a beekeeper may configure and customize a beehive with any combination of rings, and with various numbers of rings. Of course, an entrance ring and a feed ring may also be positioned at opposite ends of the beehive. Honey rings and brood rings may be arranged in a desired manner, with any number of honey rings and any number of bee gate rings. As a non-limiting example, the honey ring(s) and brood ring(s) of a beehive according to this disclosure can be stacked in the same manner as the supers of a conventional beehive, with one or more brood rings on the bottom and one or more honey rings on the top.

In addition, one or more bee gate rings may also be included in a beehive to control the manner in which bees may access specific locations within the beehive or to limit access of bees (e.g., to certain types of bees, or certain sizes of bees, etc.) to specific locations within the beehive. In some embodiments, a plurality of honey rings may be positioned directly adjacent to one another. In other embodiments, a bee gate ring may be positioned between a pair of honey rings (e.g., in shuffled, or alternating, sequence, etc.). In some embodiments, bee gate rings may be introduced into a beehive just before extraction to force bees down and out of the honey rings.

The flexibility provided by the modularity and/or interchangeability of the rings may enable the beekeeper to tailor a beehive to one or more specific needs, as well as the flexibility to reconfigure a beehive to address and resolve one or more problems with the beehive and/or one or more problems that are experienced by the colony.

When the beekeeper determines a suitable combination and arrangement of rings, he or she may obtain and arrange the rings in the desired manner, and secure the rings in that arrangement. As a non-limiting example, the beekeeper may insert tie rods through aligned locator holes on each side of the assembled rings, and secure the tie rods in place to secure the rings in their assembled relationship.

A variety of other features (e.g., ports, holes, etc.) in the rings and/or the beehive may serve as access points where smoke, medication or other media can be introduced into the beehive at one or more desired locations without unnecessarily disturbing the structure or arrangement of the beehive.

Any number of barrels can be stacked and, optionally, secured to one another to form a colony. In some embodiments, the manner in which the rings are secured to one another may also be used to secure one or more stacked beehives, or barrels, to one another, and even provide stability during transportation.

In some embodiments, the feeder ring, or end cap, of a beehive may include slots or other openings that enable bees from a beehive below the feeder ring to move between the upper and lower beehives without exposure to the environment in which the beehives are located.

Because the beehive may lack a box, or an outer container, inspection and extraction may be achieved by simply unsecuring adjacent rings from one another (e.g., by removing tie rods, etc.). Once the rings are unsecured from each other, they may be individually handled or manipulated. Thus, one or more rings may be removed from the assembled relationship of the beehive. In a specific embodiment, one or more honey rings may be removed from a beehive according to this disclosure, and then the honeycomb carried by each honey ring may be de-capped and honey removed therefrom. Once the honey has been removed, the honey ring(s) may be cleaned, and then the beehive may be reassembled and the rings again secured to one another.

The ring(s) of a beehive according to this disclosure may also be unsecured from one another and disassembled to enable inspection, and then be repositioned and re-secured to one another following inspection.

Other aspects, as wells as features and advantages of various aspects, of the disclosed subject matter will become apparent to those of ordinary skill in the art through consideration of the ensuing description, the accompanying drawings and the appended claims.

BRIEF DESCRIPTION OF THE DRAWINGS

In the drawings:

FIG. 13A is a bottom view of an embodiment of a queen door for use with a ring of an embodiment of a beehive according to this disclosure;

FIG. 13B is a side view of the queen door of FIG. 13;

FIG. 13C is a side view of a cage attached to the queen door of FIG. 13;

FIG. 13D is a side view of the queen door of FIG. 13, showing a an embodiment of the manner in which the queen door may be associated with a queen bar insert, such as that depicted by FIG. 10.

DETAILED DESCRIPTION

Figure 1:
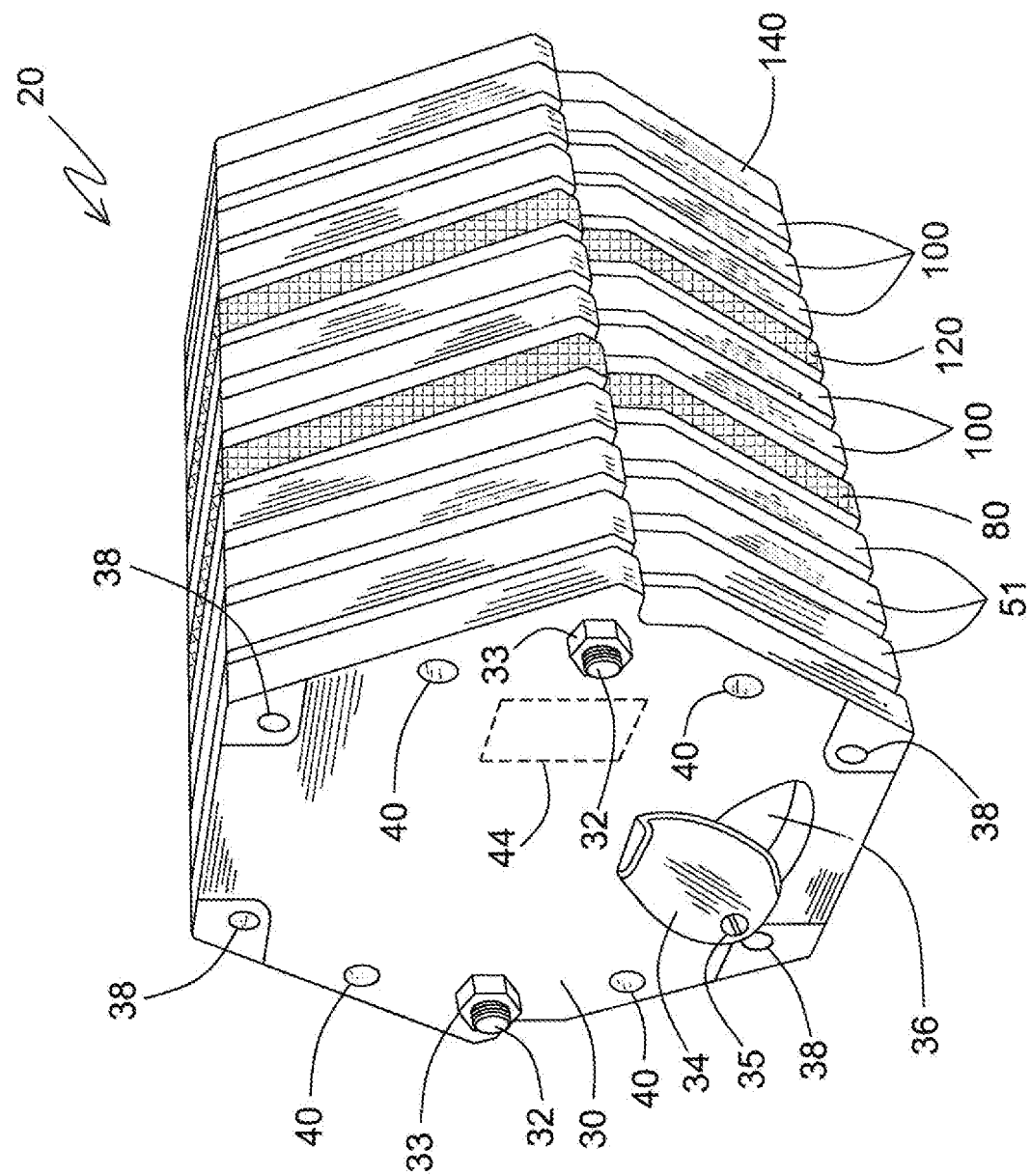
FIG. 1 is an orthogonal view of an embodiment of an assembled beehive, which includes a plurality of rings in an assembled relationship, in which the rings are stacked relative to one another and secured to each other.

In the following detailed description of the invention, reference is made to the drawings in which reference characters refer to like elements, and which are intended to illustrate specific, non-limiting embodiments of the disclosed subject matter.

Although the ensuing description relates to a single beehive, it is not limited to one beehive, or to systems that include only one or two beehives.

FIG. 1 illustrates an embodiment of a beehive 20 according to this disclosure. The beehive 20 includes, in sequence (from left to right in the horizontal orientation of the beehive shown in FIG. 1), an entrance cap 30, three brood rings 51, a queen excluder ring 80, two honey rings 100, a bee gate ring 120, three more honey rings 100, and a feeder ring 140. Of course, beehives with numbers of rings and/or with the rings in other sequences or arrangements are also within the scope of this disclosure. The configuration shown in FIG. 1 could be modified by simply rearranging of changing the number of rings, the type of rings and/or the sequence of rings.

The beehive 20 shown in FIG. 1 is held together with an embodiment of a securing mechanism that includes two tie rods 32 and complementarily threaded bolts 33. The number of tie rods 32 and bolts 33 could vary in design, material or location. In addition to tie rods 32 and bolts 33, the embodiment of securing mechanism depicted by FIG. 1 includes locator holes 38. The locator holes 38 are located in the entrance cap 30 and in each of the rings 51, 80, 100, 120, 140 that constitute the beehive 20. When the entrance cap 30 and the rings 51, 80, 100, 120, 140 are properly aligned and assembled, the locator holes 38 through the end cap 30 and each ring 51, 80, 100, 120, 140 align with locator holes 38 in the other rings 51, 80, 100, 120, 140, enabling the tie rods 32 to be introduced therethrough to secure the end cap 30 and the rings 51, 80, 100, 120, 140 together.

As illustrated, the beehive 20, its entrance cap 30 and its rings 51, 80, 100, 120, 140 may have the shapes of hexagonal prisms. A hexagonal prismatic shape may impart the beehive 20 with a stable base, as well as surfaces that enable multiple beehives 20 to be positioned adjacent to one another and to be stacked on one another.

The entrance cap 30 is the front plate of the beehive 20 and, as its name suggests, it provides the main point of entrance into (and exit from) the beehive 20 for the bees. That main point of entrance may be referred to as a "hive entrance 36." In some embodiments, a gate 34 may be associated with the hive entrance 36 of the entrance cap 30. The gate 34 may be configured to modify a size of the opening or to completely close the hive entrance 36 (e.g., to prevent bees from escaping the beehive 20 during transport, to keep bees inside the beehive 20 during the night to protect the bees from animals attempting to raid the beehive 20, etc.). In the depicted embodiment, the gate 34 includes a movable plate, or closure slide, that may be pivotally secured in place (i.e., in a manner that provides the hive entrance 36 with a desired opening size, or accessibility) with a screw 35. A position of the gate 34 may be adjusted or controlled manually (e.g., with a knob, etc.) or automatically (e.g., with an electric motor, etc.). Although the gate 34 is shown as being located on an exterior surface of the entrance cap 30, it may be positioned elsewhere (e.g., within the entrance cap 30, on an interior surface of the entrance cap 30, etc.).

In some embodiments, a beehive 20 may also include one or more ports 40, which may extend through the entrance cap 30 or elsewhere in the beehive 20 to enable a beekeeper to insert smoke, medications or other media into the beehive 20. The ports 40 may be configured to enable the introduction of media into the beehive 20 without disturbing the structure of the beehive 20 (e.g., disassembling part of the beehive 20, as is required when media is introduced into a conventional Langstroth beehive, etc.). In some embodiments, the port holes 40 may be configured to receive a tube, which may deliver the desired media into the beehive 20.

Figure 2:
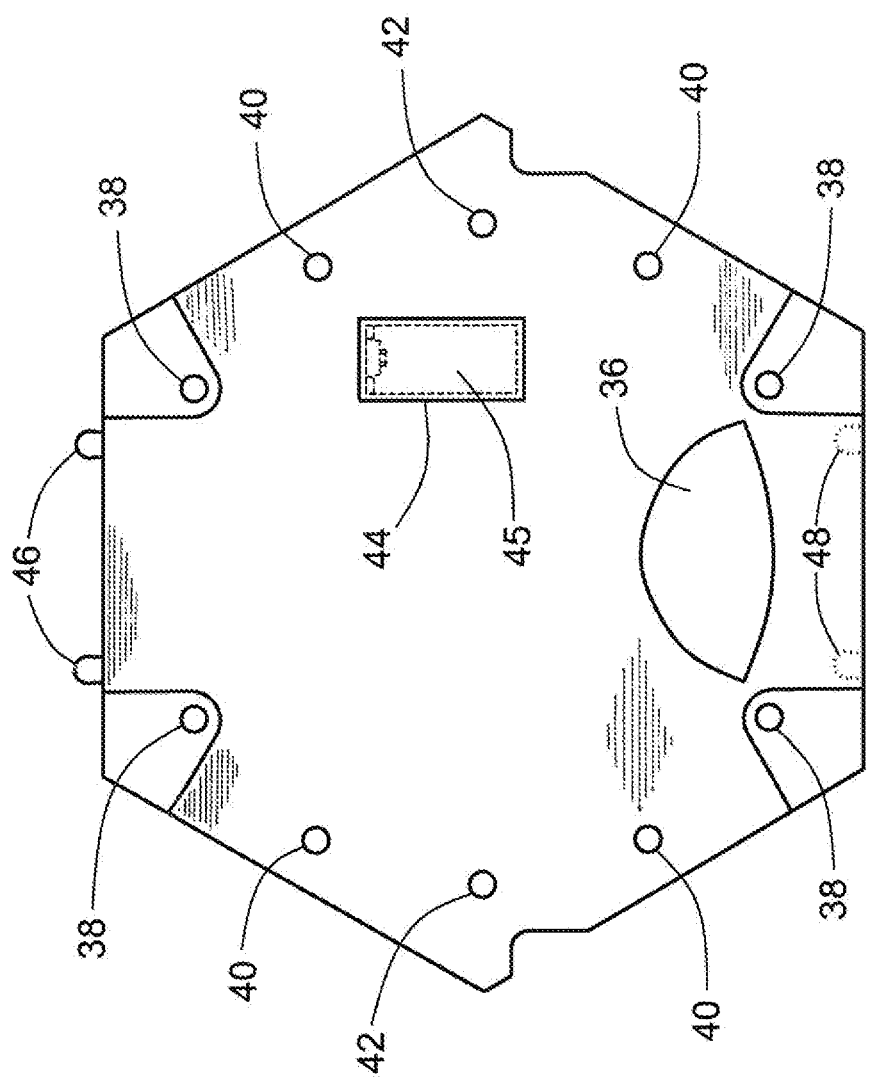
FIG. 2 is a front view of an embodiment of an entrance ring of a beehive of this disclosure.

An entrance cap 30 or another location on the beehive 20 may include a queen closet assembly port, or a "queen door 44." The queen door 44 is an optional port that can be used to introduce a queen bee into the beehive 20. As shown in FIG. 2, which provides a front view of the entrance cap 30, the queen door 44 may be configured to receive a queen bee closet 45, which can be used to introduce a new queen bee into the beehive 20.

FIG. 2 also shows two mounting pins 46, which are located on an outer periphery of the entrance cap 30 (at the surface appearing at the top of FIG. 2). These mounting pins 46 may be configured for receipt by corresponding mounting cavities 48 recessed in an opposite surface of the outer periphery of the entrance cap 30 (the surface appearing at the bottom of FIG. 2). The mounting pins 46 and mounting cavities 48 may ensure that adjacent beehives 20 are properly aligned with one another, and to enable the beehives 20 to be secured to one another (e.g., with locking clips, etc.), which may impart an arrangement that includes a plurality of beehives 20 with stability.

Figure 3A:
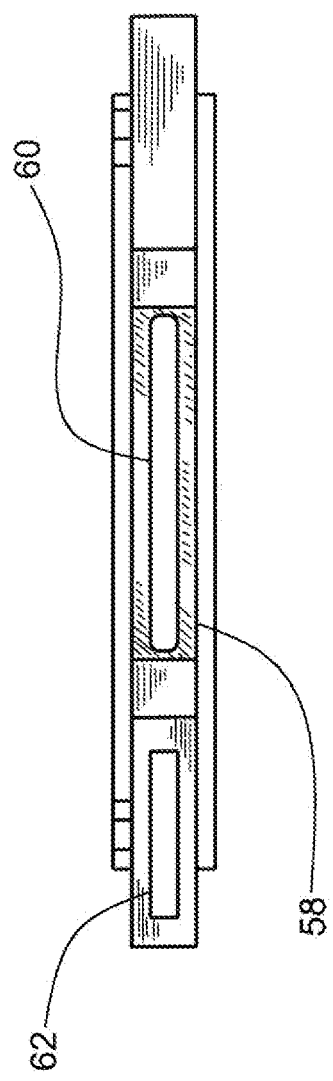
FIGS. 3A and 3B are top and front views of an embodiment of a super ring of a beehive of this disclosure.
Figure 3B:
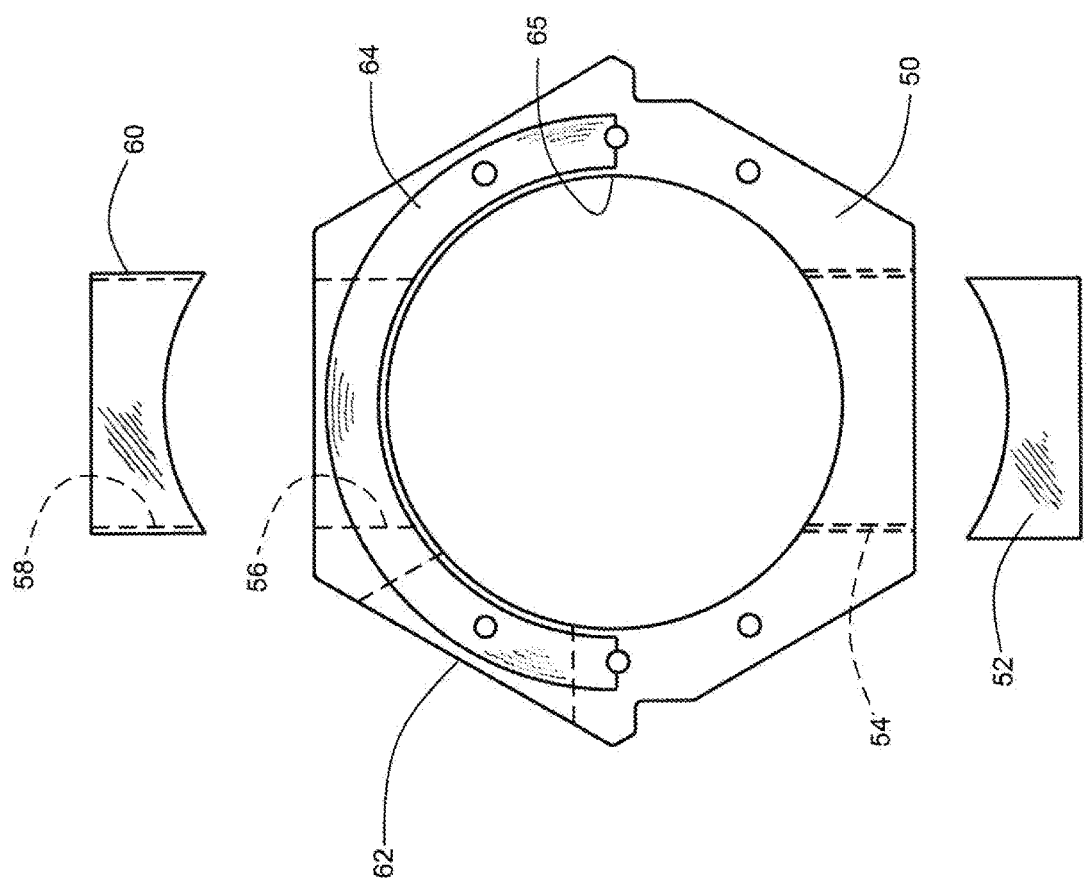

Turning now to FIGS. 3A and 3B, an embodiment of a foundation ring 50 is depicted. The foundation ring 50 may be referred to as such because, by simply changing an insert that is inserted into a cavity 65 of the foundation ring 50 and secured to the foundation ring 50, it can be used to provide a variety of different configurations of rings, e.g., a queen harvesting ring, a brood ring, a queen excluder ring, honey ring, a bee gate ring, a feeder ring, etc. As depicted the outer periphery of each ring comprises a continuous structure.

Ports may extend through a perimeter (i.e., from an outer periphery to an inner periphery) of the foundation ring 50. In the depicted embodiment, the foundation ring 50 may include a top port 56 and bottom port 54. The top port 56 and the bottom port 54 may remain open or an insert 52, 58 may be positioned therein. FIG. 3B shows two types of inserts: a blockage insert 52, which may completely close the top port 56 or the bottom port 54 within which the blockage insert 52 is positioned; and an open insert 58, through which a passage 60 extends, and, thus, that may effectively reduce the size of the opening through the top port 56 or the bottom port 54 within which the open insert 58 is positioned.

If two beehives 20 (FIG. 1) are stacked, the top port 56 on the bottom beehive 20 and the bottom port 54 on the top beehive may be opened (i.e., inserts may be removed therefrom) and aligned with one another. Alternatively, an open insert 58 may be introduced into one or both of the top port 56 of the bottom beehive 20 and the bottom port 54 of the top beehive 20. Such arrangements may enable bees to move between the beehives 20 without entering into the environment in which the beehives 20 are located.

When two beehives 20 (FIG. 1) are stacked, a blockage insert 52 may be inserted into the top port 56 of the upper beehive 20. The blockage insert 52 may protect the beehive 20 from environmental elements (e.g., rain, snow, hail, wind, etc.). Optionally, a blockage inset 52 may be inserted into the bottom port 54 of the lower beehive 20.

If a beehive 20 is not stacked, or if the beekeeper does not want to enable bees to travel directly between adjacent, stacked beehives 20, (a) blockage insert(s) 52 may be introduced into the top port 56 and/or the bottom port 54 of one or more of the beehives 20.

FIGS. 3A and 3B also show an embodiment of foundation ring 50 that includes a queen port 62. The queen port 62 and a queen insert 180 for the queen port 62 are described in further detail in reference to FIGS. 13A through 13D.

Figure 4:
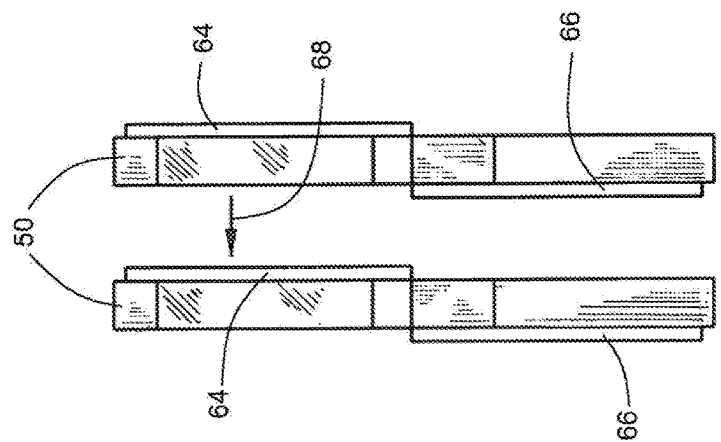
FIG. 4 is an exploded side view showing two adjacent rings of a beehive according to this disclosure.

As shown in FIGS. 3A, 3B and 4, a foundation ring 50 may also include one or more ring spacers 64, 66. In particular, FIGS. 3A, 3B and 4 illustrate an upper ring spacer 64 and a lower ring spacer 66, which are located on opposite sides of the foundation ring 50. Each of the upper ring spacer 64 and the lower ring spacer 66 protrudes from half (i.e., the upper half and the lower half) of its respective surface of the foundation ring 50. When two foundation rings 50 are positioned adjacent to one another and assembled with each other, the upper ring spacer 64 and the lower ring spacer 66 on the opposed surfaces of the foundation rings 50 are coplanar and may facilitate proper rotational alignment of the adjacent foundation rings 50 (see, e.g., FIG. 4), and may together define a complete spacer ling between the foundation rings 50.

Figure 5:
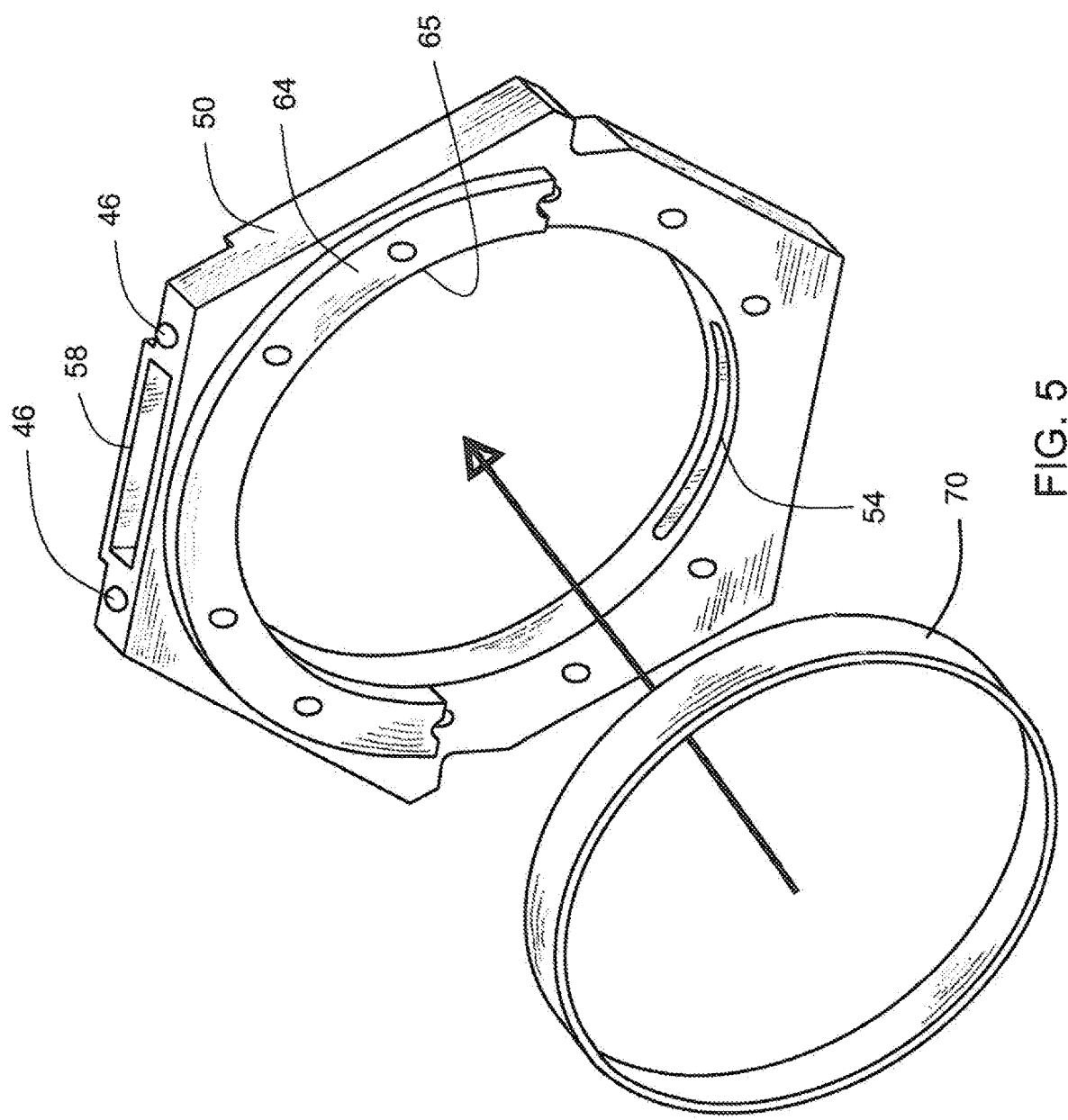
FIG. 5 is an exploded view of a super ring and a ring insert of a beehive of this disclosure.

Turning now to FIG. 5, assembly of an insert 70 and a foundation ring 50 is depicted. No attachment means is provided in this embodiment; however attachment and securement could be accomplished via a variety of techniques, including, but not limited to an interference fit, a press fit, a spring-loaded ball connector, a screw or bolt fastener, complementary threading on an inner periphery of the foundation ring 50 and an outer periphery of the insert 70, a threaded bayonet style attachment, and adhesive or any other suitable attachment mechanism.

FIGS. 6 through 10 illustrate various embodiments of inserts that can be inserted into a ring cavity 65 (FIGS. 4 and 5) of a foundation ring 50. This interchangeability of inserts 70 makes a beehive 20 according to this disclosure not only modular in configuration, but configurable for any requirement. It is anticipated that additional ring inserts will be developed, as the need arises. These additional insert could include sensors and/or hive monitoring devices.

Figure 6:
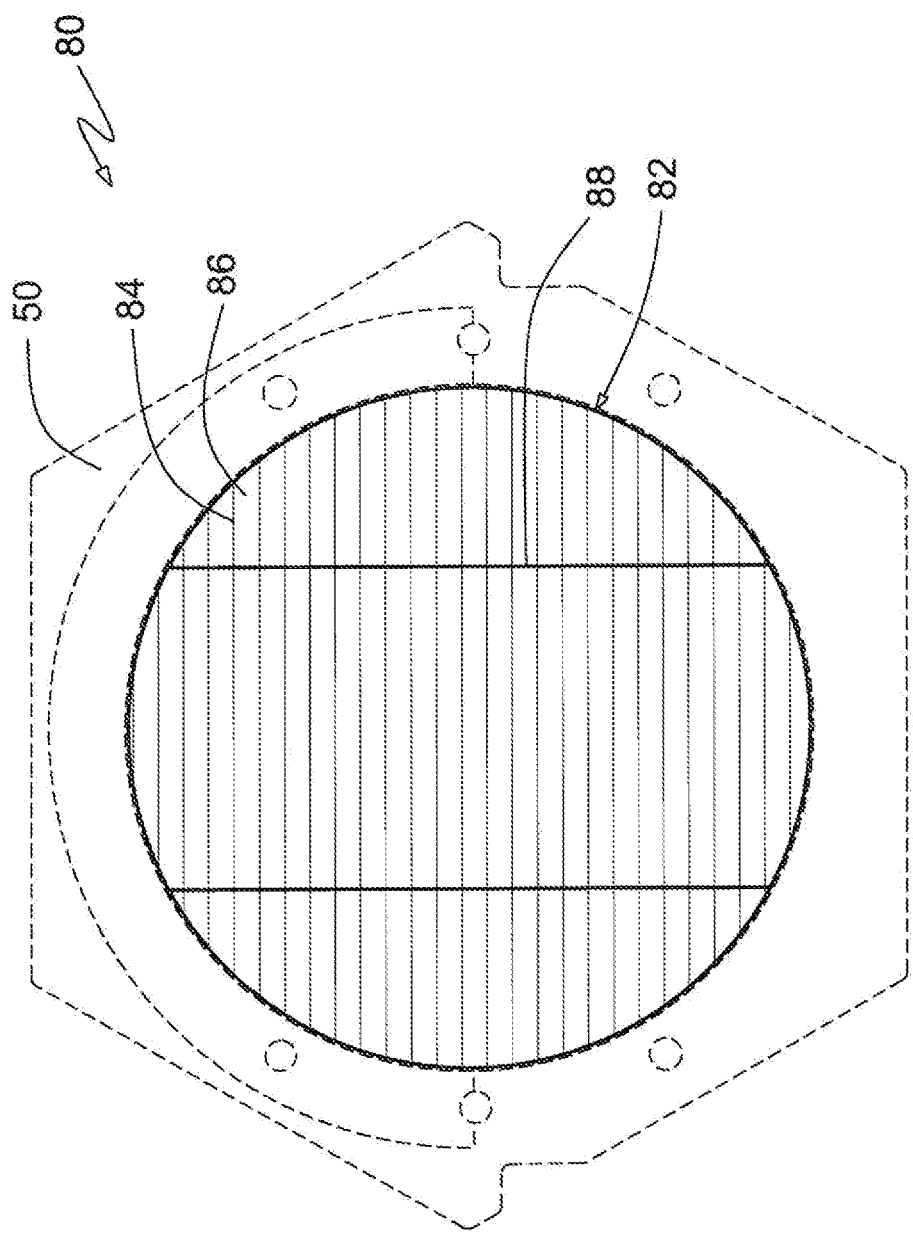
FIG. 6 is a front view of an embodiment of a queen excluder insert for a ring of a beehive according to this disclosure.

FIG. 6 shows an embodiment of a queen excluder insert 82, which may be assembled with a foundation ring 50 to provide a queen excluder ring 80. The queen excluder insert 82 may be configured not to allow a queen bee to pass therethrough and, thus, may prevent passage of the queen bee into certain areas of the beehive 20 (FIG. 1). The queen bee is larger in size than other bees and, thus, by provided a screen wherein the screen openings 86 are smaller than the queen bee, but larger than a normal bee, the queen bee is excluded passage through the queen bee insert 82. In the specific embodiment depicted by FIG. 6, the queen excluder insert 82 includes slats 84 and support structure beams 88. The queen excluder ring 80 is an optional ring.

Figure 7:
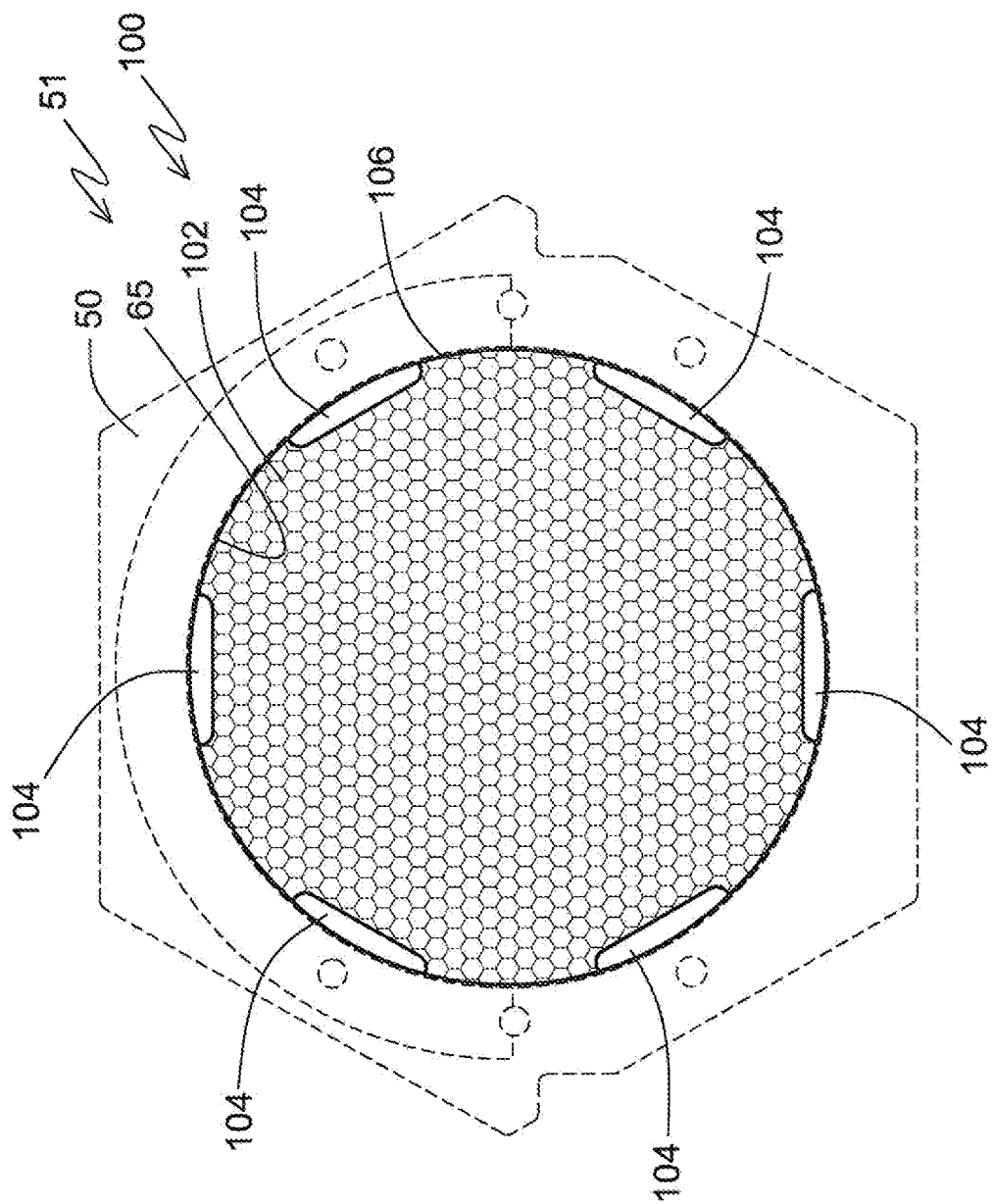
FIG. 7 is a front view of an embodiment of a foundation insert for a ring of a beehive according to this disclosure.
Figure 8:
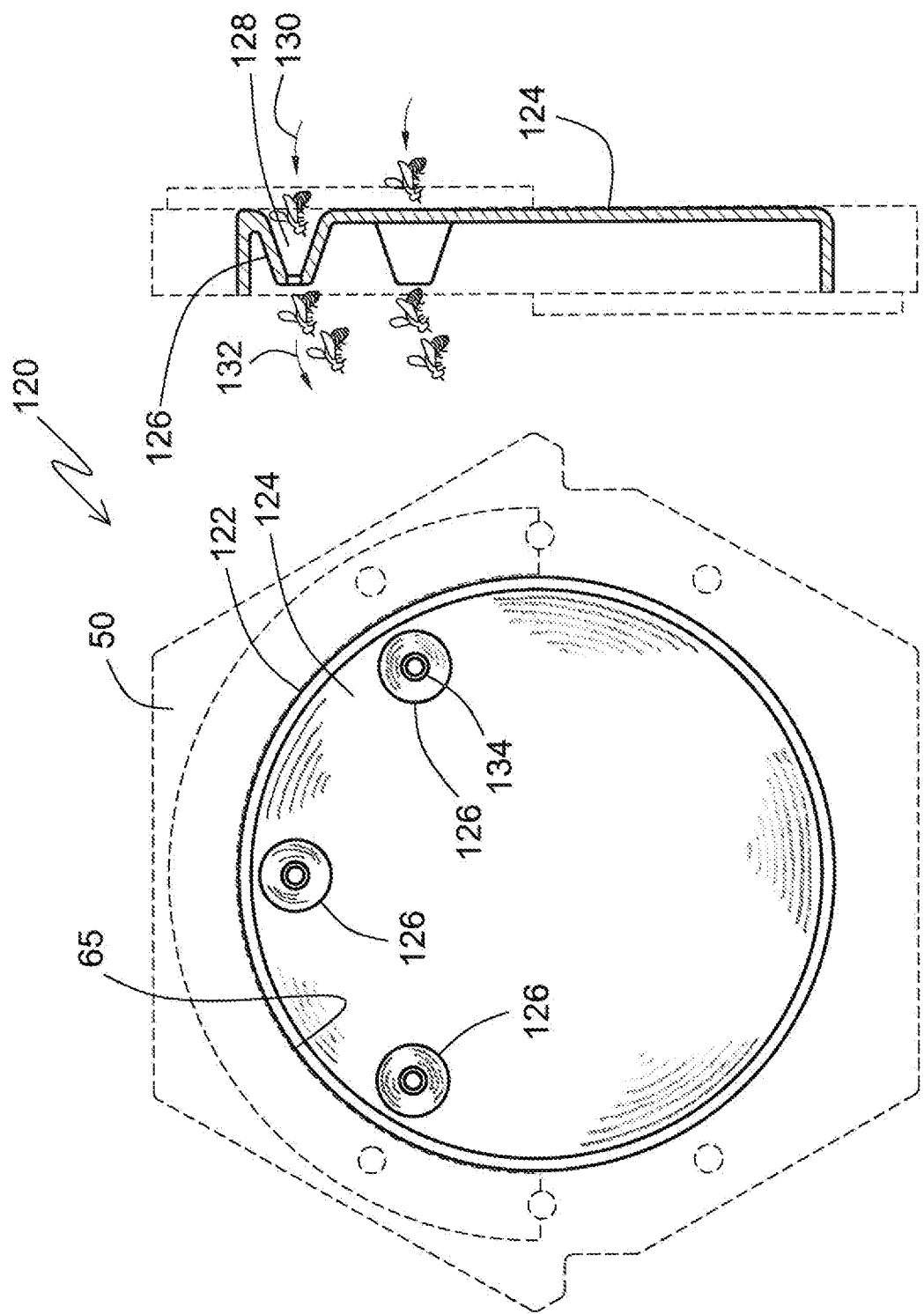
FIGS. 8A and 8B are front and side views of an embodiment of a bee gate insert for a ring of a beehive according to this disclosure.

FIG. 7 shows an embodiment of a honey ring 51, which may include a foundation ring 50 and a honey insert 106. The honey insert 106 is inserted into the ring cavity 65 of the foundation ring 50. This same honey insert 106 may also be used to define brood ring 100. The honey insert 106 includes a honey comb base 102 that may be used by bees to build their honey storage or to house eggs and bee larva. Passageways 104 may be located around the outer periphery of the honey insert 106 to enable bees to move through the honey ring 51 or the brood ring 100. Honey rings 51 and brood rings 100 are required to establish a proper beehive 20 (FIG. 1), and any number of honey rings 51 and brood rings 100 may be included in the beehive 20, based on the beekeeper's desires.

FIGS. 8A and 8B show an embodiment of a bee gate insert 124 and the bee gate ring 120 defined by the bee gate insert 124 and a foundation ring 50. The bee gate insert 124 is inserted into the ring cavity 65 of the foundation ring 50. The bee gate insert 124 is configured to enable bees to pass therethrough in a first direction, but prohibit the bees from returning, or passing therethrough in an opposite, second direction. The bee gate insert 124 may include a plurality of cone ports 126. A bee may enter a cone port 126, as shown by the direction arrow 130, crawl or fly through the cone hole 134 in the cone port 126 and exit the cone port 126, as shown by the direction arrow 132. Each cone port 126 may be oriented horizontally (i.e., directly through a thickness of the bee gate insert 124), as shown, or vertically (not shown). The bee gate insert 124 may facilitate removal of bees from a section of the beehive 20 (FIG. 1). As an example, in order to extract honey from a honey ring 51 (FIGS. 1 and 7), it may be desirable to first remove bees from the honey ring 51. A bee gate ring 120 may be introduced into a beehive 20 just prior to extracting honey to force the bees down and out of the honey rings 51.

Figure 9:
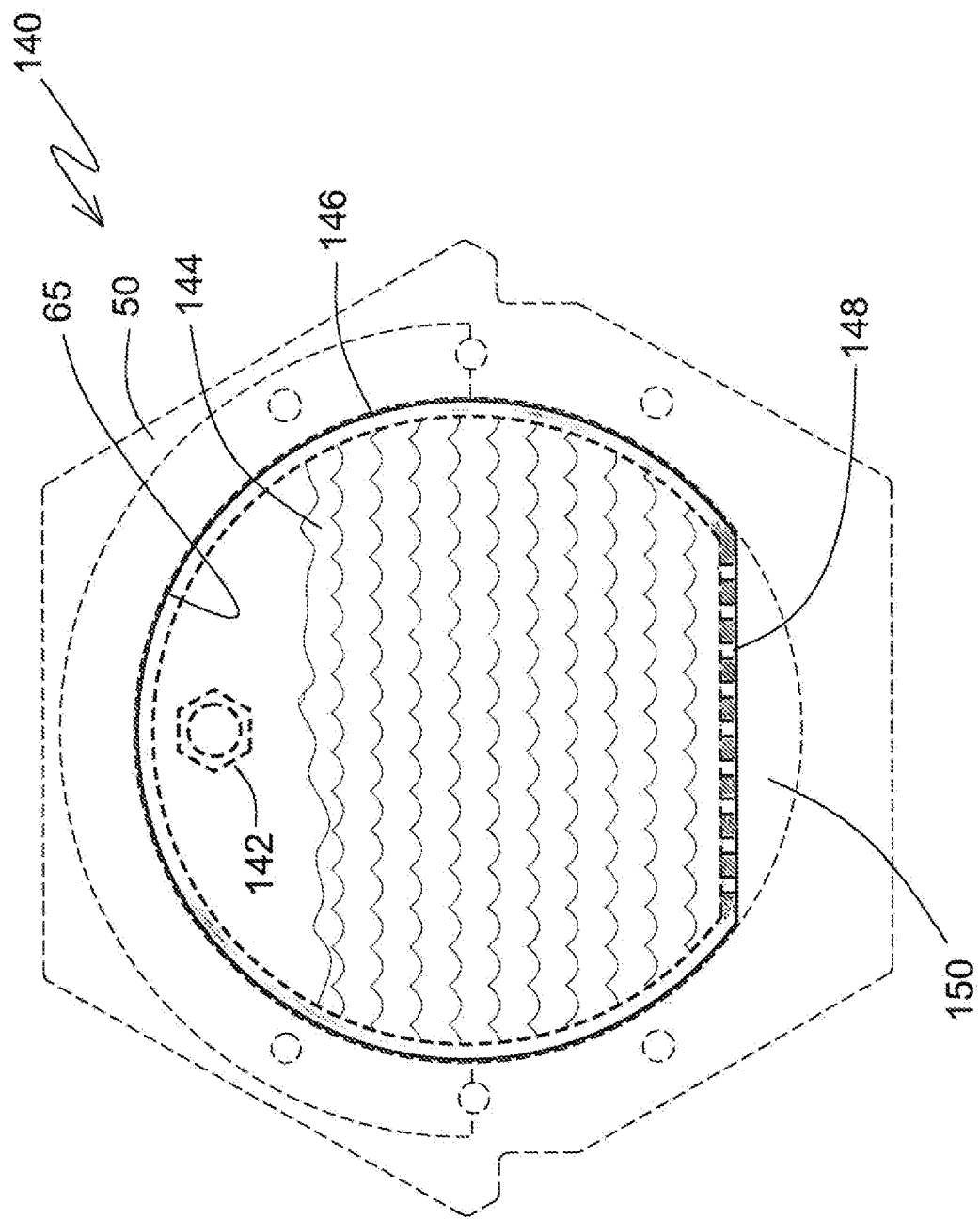
FIG. 9 is a front view of an embodiment of a feeder insert for a ring of a beehive according to this disclosure.

FIG. 9 depicts an embodiment of a feeder ring 140, which includes a foundation ring 50 and a feeder insert 146 within the ring cavity 65 of the foundation ring 50. The feeder ring 140 may be located at a back end of a beehive 20 (FIG. 1) to provide a beekeeper with ready access to a fill port 142 that extends through the feeder insert 146. The feeder insert 146 may comprise a tank 144 that can be filled with food for the bees. The bees can access the bottom of the feeder insert 146 via a feeding area 150. Once the bees are in the feeding area 150, they may access food or other substances within the tank 144 through feeding holes 148, which may comprise a membrane or any other suitable dispensing elements.

Figure 10:
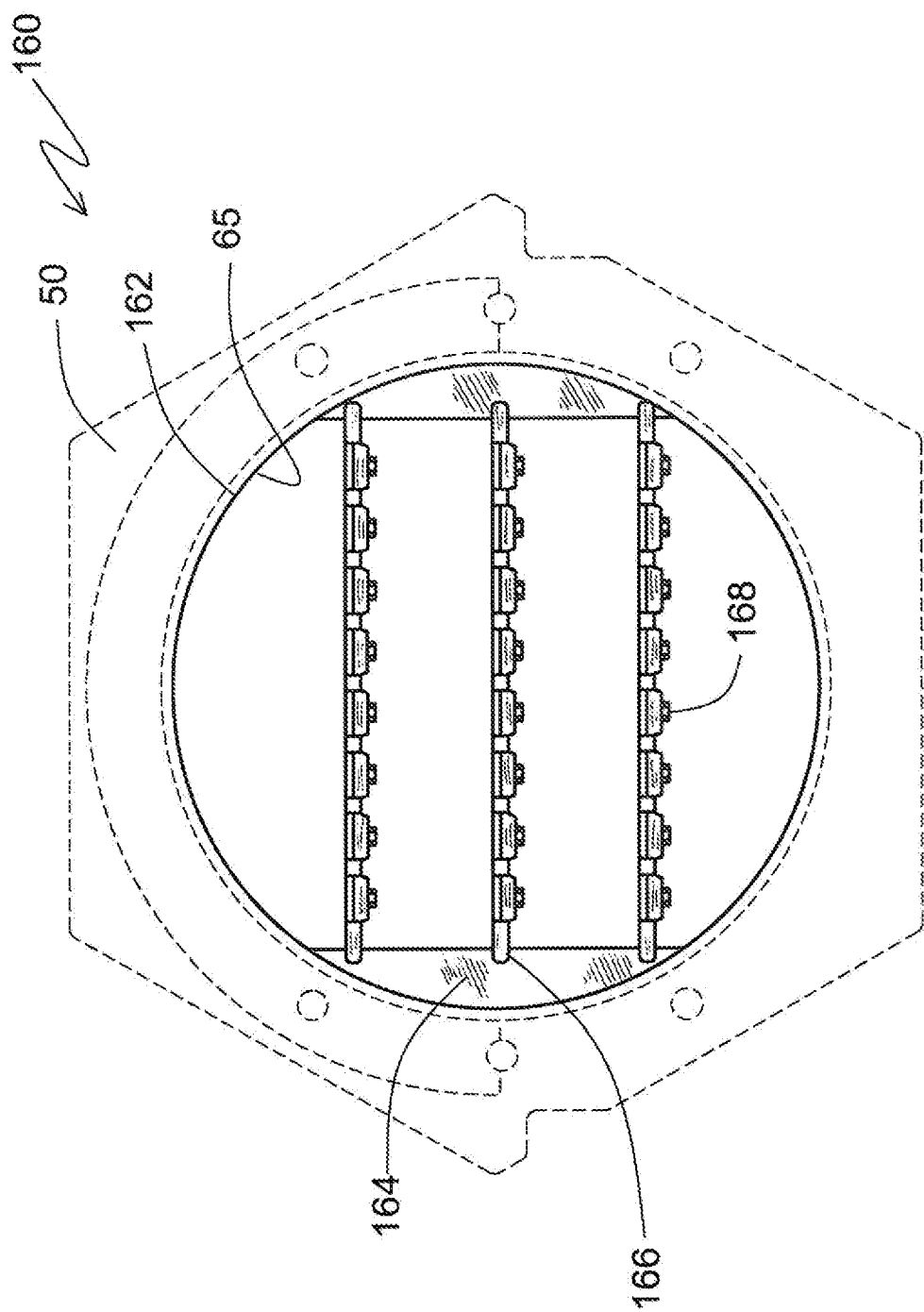
FIG. 10 is a front view of an embodiment of a queen bar insert for a ring of a beehive according to this disclosure.
Figure 11:
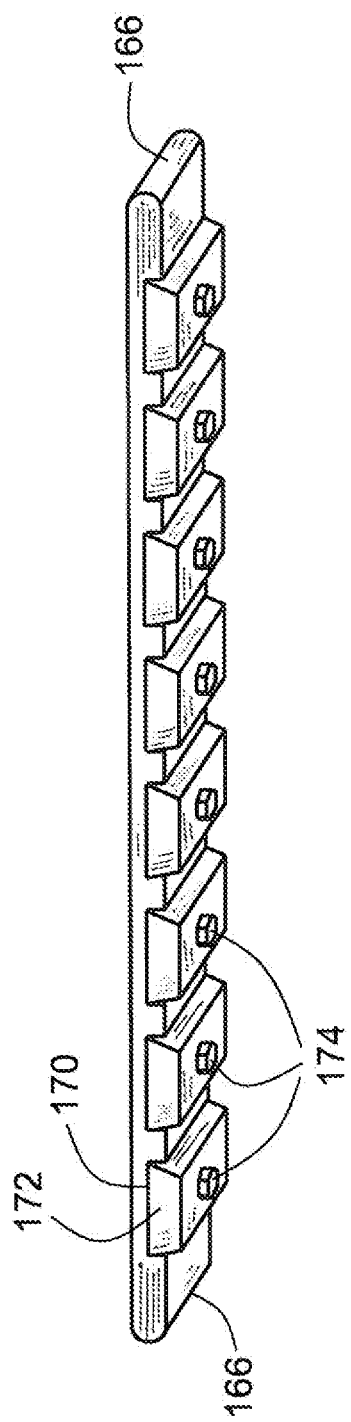
FIG. 11 is an orthogonal view of an embodiment of a queen bar that may be included on a queen bar insert, such as that depicted by FIG. 10.

In FIG. 10, an embodiment of a queen bar insert 162 is depicted. The queen bar insert 162 may be inserted into the ring cavity 65 of a foundation ring 50 to form a queen harvesting ring 160. The sides of the queen bar insert 164 may be notched to accept one or more queen bars 166. FIG. 11 provides a perspective view of an embodiment of a queen bar 166. The queen bar 166 includes slots 170, which may be configured to receive queen capsule holders 172. Each queen capsule holder 172 may comprise a hexagonal protrusion 174 that may be used by bees to build a queen egg sack (not shown). When the queen egg sack is ready for harvesting, the queen capsule holder 172 can be removed from the notches 170 in the queen bar insert 164 and subsequently used by the beekeeper to cultivate new bee colonies, and/or to revitalize existing bee colonies.

Figure 12:
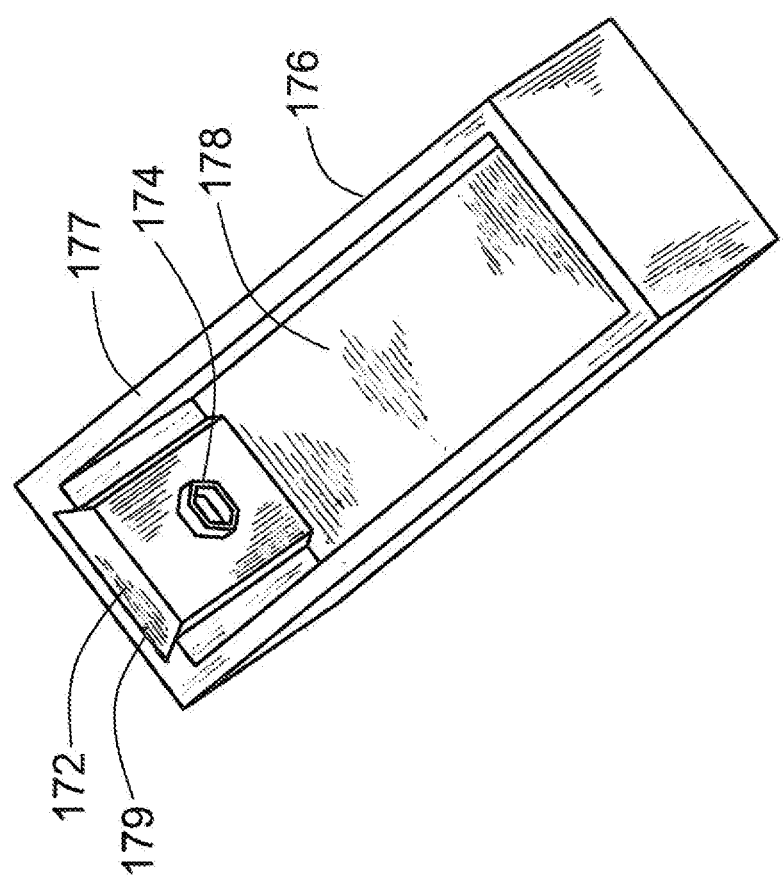
FIG. 12 is an orthogonal view of an embodiment of a queen cell.

FIG. 12 illustrates an embodiment of a queen cell 176. The queen capsule holder 172 with a ready-to-harvest queen sack (not shown) is attached to the queen cell 176 via a receiving slot 179 in the top of the queen cell 176. The queen cell 176 with the queen sack may be placed directly into a queen closet 45 on the entrance ring 30 (FIG. 2). The queen cell 176 is placed with the open box surface 177 facing inward, thus allowing the queen to exit the queen cell 176 and enter the beehive 20 (FIG. 1).

FIGS. 13A through 13D show an embodiment of a way in which a queen bee can be introduced into a beehive 20 (FIG. 1) according to this disclosure. FIGS. 13A and 13B are, respectively, bottom and cross-sectional views of a queen insert 180 for a queen port 62 (see also, FIGS. 3A and 3B). FIG. 13D illustrates a manner in which the queen insert 180 may be associated with a queen port 62 of a foundation ring 50. Without limitation, an attachment element 188 may movably (e.g., pivotally, slidingly, etc.) secure the queen insert 180 to the foundation ring 50, over the queen port 62 in a manner that selectively provides access to a bottom, or interior, surface of the queen insert 180 and that introduces the bottom, or interior, surface of the queen insert 180 into the queen port 62, sealing side surfaces of the queen insert 180 against corresponding portions of a port wall 190 of the queen port 62.

When the bottom surface of the queen insert 180 is accessible, it may accept a queen cage 186 (e.g. a standard, commercially available, etc.), as shown in FIG. 13C. More specifically, the queen insert 180 may include a mounting hole 182 for receiving a portion of the queen cage 186. The queen cage 186 may include a screen 184 within which a queen bee that is being introduced into the beehive 20 may be initially contained. The screen 184 may allow bees interact with the caged queen bee, enabling the bees to contact, care for, feed and become accustomed to the new queen bee. When the queen insert 180 first introduces the queen cage 186 and the queen bee therein into a beehive 20, a hole 192 at a bottom of the queen cage 186 may be covered by a plug 194 (e.g., a marshmallow, another material that may be removed over time, a material that will degrade over time, etc.). After sufficient time has passed for the bees in the beehive 20 to become accustomed to the new queen bee, the plug 194 may be removed (e.g., once bees have eaten the marshmallow, etc.), and the queen bee may exit the queen cage 186 and enter the beehive 20.

Figure 14B:
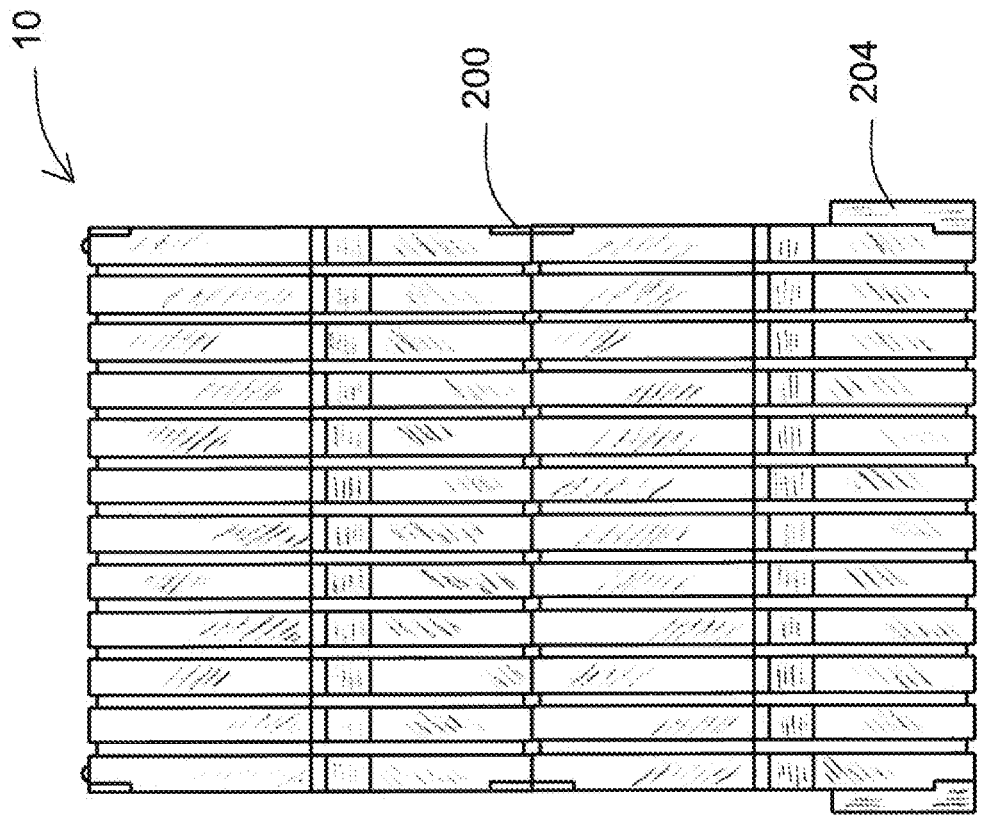
FIGS. 14A and 14B are front and side views of an embodiment of a beehive system that includes two stacked beehives, or barrels.
Figure 14A:
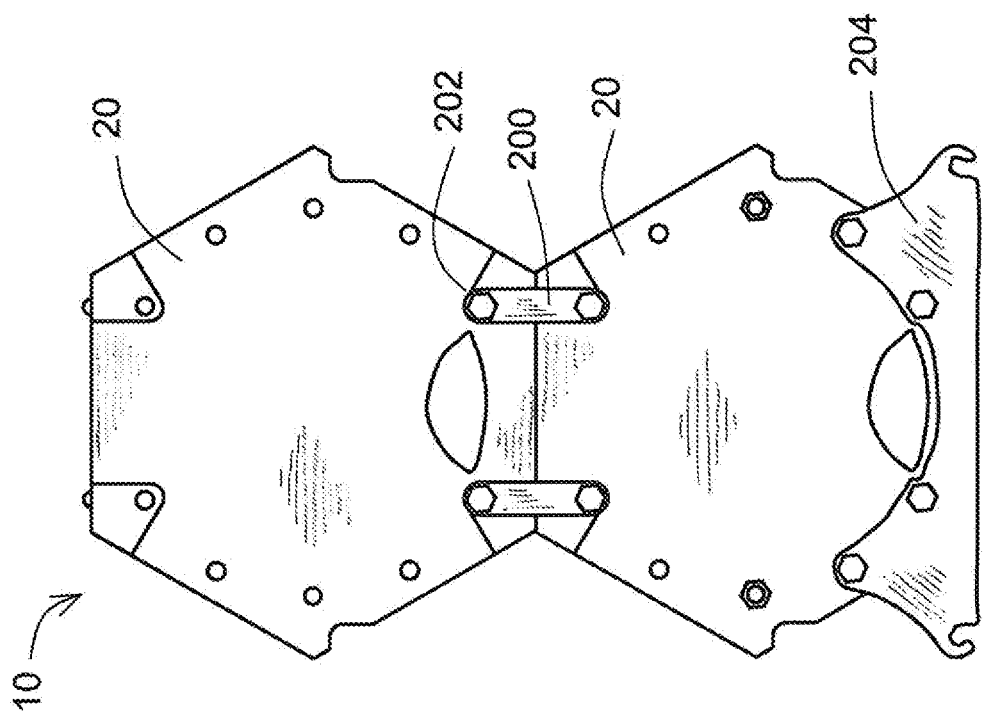

As shown in FIGS. 14A and 14B, an assembly 10 that includes a plurality of beehives 20 is depicted. The beehives 20 are stacked, one atop another, and may be secured to one another with a suitable securing mechanism 200, 202, such as the depicted tie rods and bolts, respectively. FIGS. 14A and 14B also depict a base plate 204, which may stabilize a beehive 20 to which it is secured, as well as an assembly 10 of which that beehive 20 is a part.

Although the preceding disclosure provides many specifics, these should not be construed as limiting the scope of any of the ensuing claims. Other embodiments may be devised which do not depart from the scopes of the claims. Features from different embodiments may be employed in combination. The scope of each claim is, therefore, indicated and limited only by its plain language and the full scope of available legal equivalents to its elements.

What is claimed:

1. A beehive, comprising: a plurality of rings configured to be positioned adjacent to one another, each ring in the plurality of rings being formed in a hexagonal prismatic shape, the hexagonal prismatic shape of each ring in the plurality of rings imparting a stable base to the beehive and configuring the beehive to be positionable adjacent to other beehives and stackable on top of other beehives, wherein the plurality of rings comprise:

at least a first ring selected from the plurality of rings, the first ring comprising a first upper ring spacer that protrudes from an upper half of a first side of the first ring and a first lower ring spacer that protrudes from a lower half of a second side of the first ring, the second side of the first ring being opposite from the first side of the first ring, at least a second ring selected from the plurality of rings, the second ring comprising a second upper ring spacer that protrudes from an upper half of a first side of the second ring and a second lower ring spacer that protrudes from a lower half of a second side of the second ring, the second side of the second ring being opposite from the first side of the second ring, and the first ring positioned adjacent to the second ring, the first upper ring spacer on the first side of the first ring and the second lower ring spacer on the second side of the second ring together defining a complete ring spacer between the first ring and the second ring and facilitating proper rotational alignment of the first ring and the second ring; the plurality of rings further including:

an entrance cap configured to be positioned at a first end of the beehive to enable bees to enter into and exit the beehive, the entrance cap comprising a first connection point interfacing with a particular tie rod;

at least one honey ring, the at least one honey ring comprising a second connection point interfacing with the particular tie rod;

at least one brood ring, the at least one brood ring comprising a third connection point interfacing with the particular tie rod extend therethrough;

a feeder ring, the feeder ring positioned at a second end of the beehive on an extreme opposing side from the entrance cap, the feeder ring comprising a fourth connection point interfacing with the particular tie rod extend therethrough; and wherein:

the particular tie rod secures the entrance cap, the at least one honey ring, the at least one brood ring, and the feeder ring together, the particular tie rod directly, physically contacts the entrance cap, the at least one honey ring, the at least one brood ring, and the feeder ring, the first connection point, the second connection point, the third connection point, and the fourth connection point are each separate and distinct physical structures, the entrance cap, the at least one honey ring, the at least one brood ring, and the feeder ring are not enclosed within a beehive box, and each ring within the plurality of rings comprises: a top port that extends from an outer periphery to an inner periphery of each respective ring selected from the plurality of rings, a top insert placed within the top port of each respective ring, each top insert at least partially reducing a size of an opening associated with the top port of each respective ring, a bottom port that extends from an outer periphery to an inner periphery of each respective ring selected from the plurality of rings, a bottom insert placed within the bottom port of each respective ring, each bottom insert at least partially reducing a size of an opening associated with the bottom port, and the top port configured to align with a bottom port of another beehive to allow a passage between the beehive and the other beehive through the top port and the bottom port.

2. The beehive of claim 1, wherein the plurality of rings includes at least one foundation ring configured to receive a plurality of different types of inserts that will impart the at least one foundation ring with a particular functionality.

3. The beehive of claim 2, further comprising: at least one insert.

4. The beehive of claim 3, wherein the at least one insert comprises a honey insert or a brood insert, or a combination thereof.

5. The beehive of claim 3, wherein the at least one insert comprises one or more of a sensor insert, a queen excluder insert, a bee gate insert, a feeder insert, and a queen bee insert.

6. The beehive of claim 1, wherein the plurality of rings are vertically oriented in series with one another, with the entrance cap located at a first end of the series, the feeder ring at a second end of the series, with the second end being opposite from the first end, and the at least one honey ring and the at least one brood ring positioned between the entrance cap and the feeder ring.

7. The beehive of claim 1, wherein walls of the entrance cap, the at least one honey ring and the at least one brood ring have thicknesses that impart the beehive with strength and rigidity.

8. The beehive of claim 1, further comprising:
two mounting pins located on a first outer periphery of the entrance cap, the mounting pins configured for receipt of corresponding mounting cavities recessed in an opposite surface of a second outer periphery of another entrance cap integrated into another beehive.

9. The beehive of claim 1, wherein the first upper ring spacer on the first side of the first ring is coplanar with the second lower ring spacer on the second side of the second ring.

10. The beehive of claim 1, wherein each ring in the plurality of rings comprises a continuous, uninterrupted outer periphery.

11. A box-less beehive, comprising: a plurality of rings configured to be positioned adjacent to one another, each ring in the plurality of rings being formed in a hexagonal prismatic shape, the hexagonal prismatic shape of each ring in the plurality of rings imparting a stable base to the box-less beehive and configuring the box-less beehive to be positionable adjacent to other beehives and stackable on top of other beehives, the plurality of rings including:
at least a first ring selected from the plurality of rings, the first ring comprising a first upper ring spacer that protrudes from an upper half of a first side of the first ring and a first lower ring spacer that protrudes from a lower half of a second side of the first ring, the second side of the first ring being opposite from the first side of the first ring;
at least a second ring selected from the plurality of rings, the second ring comprising a second upper ring spacer that protrudes from an upper half of a first side of the second ring and a second lower ring spacer that protrudes from a lower half of a second side of the second ring, the second side of the second ring being opposite from the first side of the second ring; the first ring positioned adjacent to the second ring, the first upper ring spacer on the first side of the first ring and the second lower ring spacer on the second side of the second ring together defining a complete ring spacer between the first ring and the second ring and facilitating proper rotational alignment of the first ring and the second ring;
an entrance cap configured to be positioned at an end of the box-less beehive to enable bees to enter into and exit the box-less beehive, the entrance cap comprising a first hole with a particular tie rod extending therethrough;
at least one honey ring, the at least one honey ring comprising a second hole with the particular tie rod extending therethrough;
at least one brood ring, the at least one brood ring comprising a third hole with the particular tie rod extending therethrough;
a feeder ring, the feeder ring comprising a fourth hole with the particular tie rod extending therethrough, the feeder ring positioned on an extreme opposing end of the box-less beehive from the entrance cap; wherein:
the particular tie rod secures the entrance cap, the at least one honey ring, the at least one brood ring, and the feeder ring together, the particular tie rod directly, physically contacts the entrance cap, the at least one honey ring, the at least one brood ring, and the feeder ring, the first hole, the second hole, the third hole, and the fourth hole are each separate and distinct physical structures, and the entrance cap, the at least one honey ring, and the at least one brood ring are not enclosed within a beehive box; and
each ring within the plurality of rings comprises:
a top port that extends from an outer periphery to an inner periphery of each respective ring selected from the plurality of rings, a top insert placed within the top port of each respective ring, each top insert at least partially reducing a size of an opening associated with the top port of each respective ring, a bottom port that extends from an outer periphery to an inner periphery of each respective ring selected from the plurality of rings, a bottom insert placed within the bottom port of each respective ring, each bottom insert at least partially reducing a size of an opening associated with the bottom port, and the top port configured to align with a bottom port of another beehive to allow a passage between the beehive and the other beehive through the top port and the bottom port.

12. The box-less beehive of claim 11, further comprising:
a top port of the box-less beehive and a bottom port of a second box-less beehive align with each other.

\* \* \* \* \*